United States Patent [19]

Kaufman

[11] 4,114,086
[45] Sep. 12, 1978

[54] INDUCTIVE SOURCE METHOD OF INDUCED POLARIZATION PROSPECTING

[75] Inventor: Aleksander Arkadi Kaufman, Downsview, Canada

[73] Assignee: Scintrex Limited, Concord, Canada

[21] Appl. No.: 774,780

[22] Filed: Mar. 7, 1977

[51] Int. Cl.² ............................................. G01V 3/08
[52] U.S. Cl. ............................................. 324/1; 324/6
[58] Field of Search ..................... 324/3, 6, 9, 1, 7

[56] References Cited

U.S. PATENT DOCUMENTS

| | | | |
|---|---|---|---|
| 2,527,559 | 10/1950 | Lindblad et al. | 324/6 |
| 2,611,004 | 9/1952 | Brant et al. | 324/1 |
| 2,685,058 | 7/1954 | Yost | 324/6 X |
| 2,735,980 | 2/1956 | Wait | 324/7 |
| 3,090,910 | 5/1963 | Moran | 324/6 |
| 3,210,652 | 10/1965 | Seigel | 324/6 X |
| 3,263,160 | 7/1966 | Dolan et al. | 324/6 |
| 3,315,155 | 4/1967 | Colani | 324/6 X |
| 3,984,759 | 10/1976 | St-Amant et al. | 324/6 |

*Primary Examiner*—Gerard R. Strecker
*Attorney, Agent, or Firm*—Fetherstonhaugh & Co.

[57] ABSTRACT

A method of geophysically prospecting a polarizable medium by measuring induced polarization effects wherein the medium is inductively polarized by a time varying current in an induction coil that varies with respect to time unidirectionally to maintain a unidirectional current flow in the medium for a first period and then does not vary with respect to time for a second period and wherein the induced polarization effects caused by the unidirectional current flow in the first period are measured during the second period.

2 Claims, 7 Drawing Figures

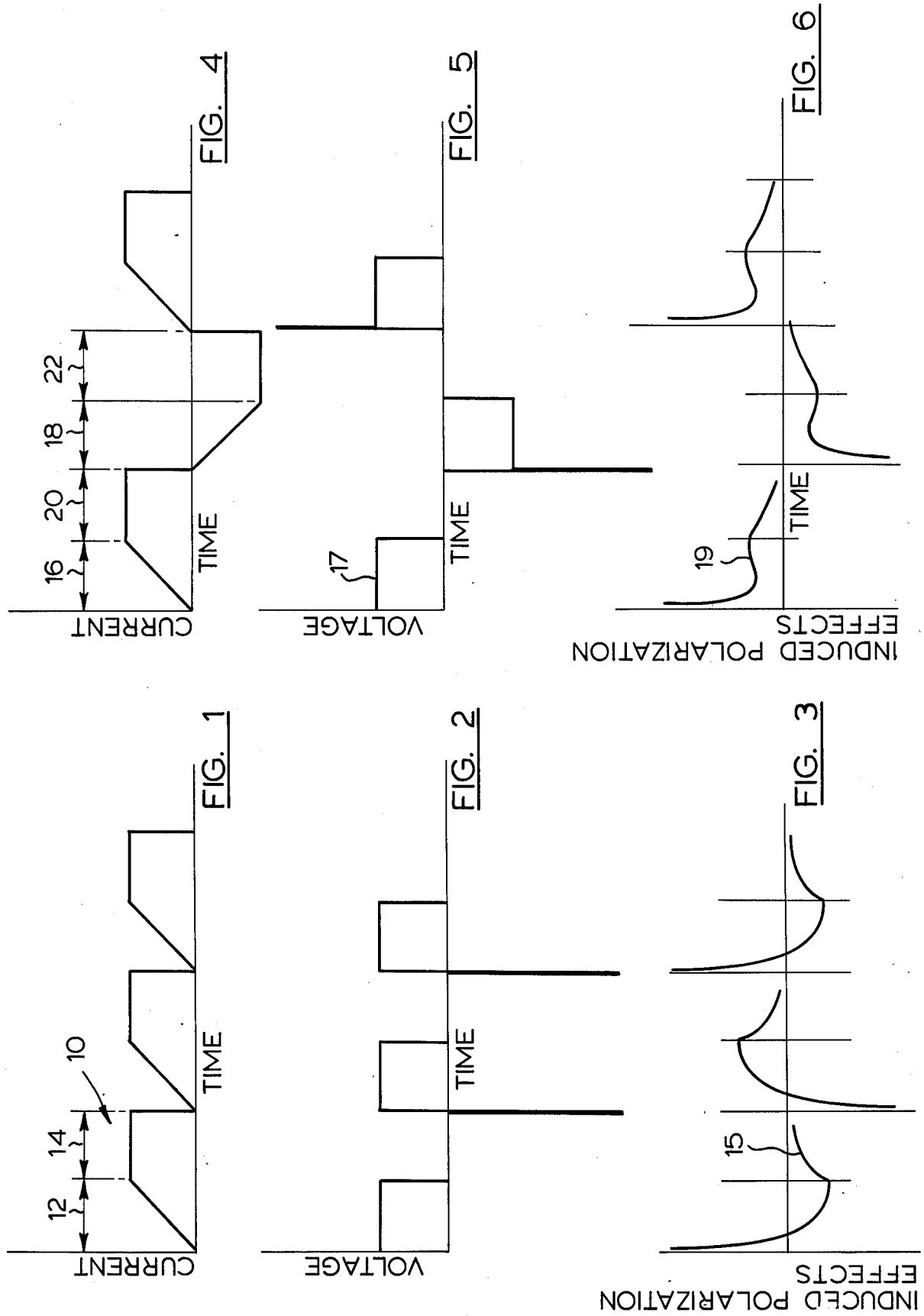

INDUCTIVE SOURCE METHOD OF INDUCED POLARIZATION PROSPECTING

This invention relates to a method of geophysically prospecting a polarizable medium. It is concerned with a prospecting method generally known as the induced polarization technique which makes use of the build up of a double layer of electrical charges when current flows across an interface between ionically and electronically conducting materials. In the method, the decay with time of the built up charge is measured as an indication of the characteristics of the medium.

The induced polarization method of geophysically prospecting a polarizable medium has been described in many published articles to be found in the geophysical literature.

With the induced polarization method, it is necessary to pass an electrical current through the medium in order to build up electrical charge at an interface between ionically and electroncially conducting materials and, in the past, it has always been considered necessary to pass this polarizing current galvanically between two electrodes physically applied to the ground. With the method of the present invention, it is possible to establish the polarization by induction. This novel approach eliminates the need for current electrodes that must contact the ground. It opens up the possibility of carrying out airborne and marine induced polarization surveys because methods already exist for making magnetic measurements of secondary fields set up by the time varying currents caused by the decay of the voltages that are set up across the ionic-electronic interfaces by the inducing currents.

A further advantage of inductive energization of the medium in accordance with this invention is that it is much easier to cause over-voltage at greater depths than it is with electrical dipoles, in cases where the geological section is composed of layers of different resistivity.

It is therefore, an object of this invention to provide a method of geophysical prospecting a polarizable medium in which it is not necessary to galvanically introduce current to the medium for the purpose of creating the polarization phenomenon the decay of which is measured. In a method of geophysical prospecting a polarizable medium according to this invention, one performs the steps of locating an induction coil in inductive proximity to the medium and transmits a time varying current therethrough of a magnitude capable of inducing current flow through the polarizable medium sufficient to establish a measurable induced polarization effect;

said time varying current in said induction coil having a first period where it varies unidirectionally for the first period to maintain current flow induced by the induction coil in the medium;

said time varying current in said induction coil having a second period following said first period wherein said time varying current does not vary substantially with respect to time and wherein there are substantially no currents in said medium induced by said induction coil;

said first period of time being sufficiently long in duration for induced polarization effects to build up in the medium;

said second period of time being sufficiently long in duration for the electro-magnetic effects to decay and for measurement of the induced polarization effects in the medium; and detecting any induced polarization effects that may be present in said second period by measurement of transient electric field components.

The invention will be clearly understood after reference to the following detailed specification read in conjunction with the drawings.

In the drawings:

FIG. 1 is a current wave form of current in a coil used to energize a polarizable medium;

FIG. 2 is the current wave form induced in the medium by a primary current wave form like the wave form of FIG. 1;

FIG. 3 is a typical induced polarization wave form showing the build up and decay of charge at an ionic-electronic interface in a polarizable medium caused by the current wave form of FIG. 2;

FIG. 4 is an alternative current wave form for an induction coil that induces current flow through the polarization medium;

FIG. 5 shows the induced current wave form in the polarizable medium resulting from the wave form of FIG. 4;

FIG. 6 shows the induced polarization medium wave form for the current wave form of FIG. 5;

Figure 7:
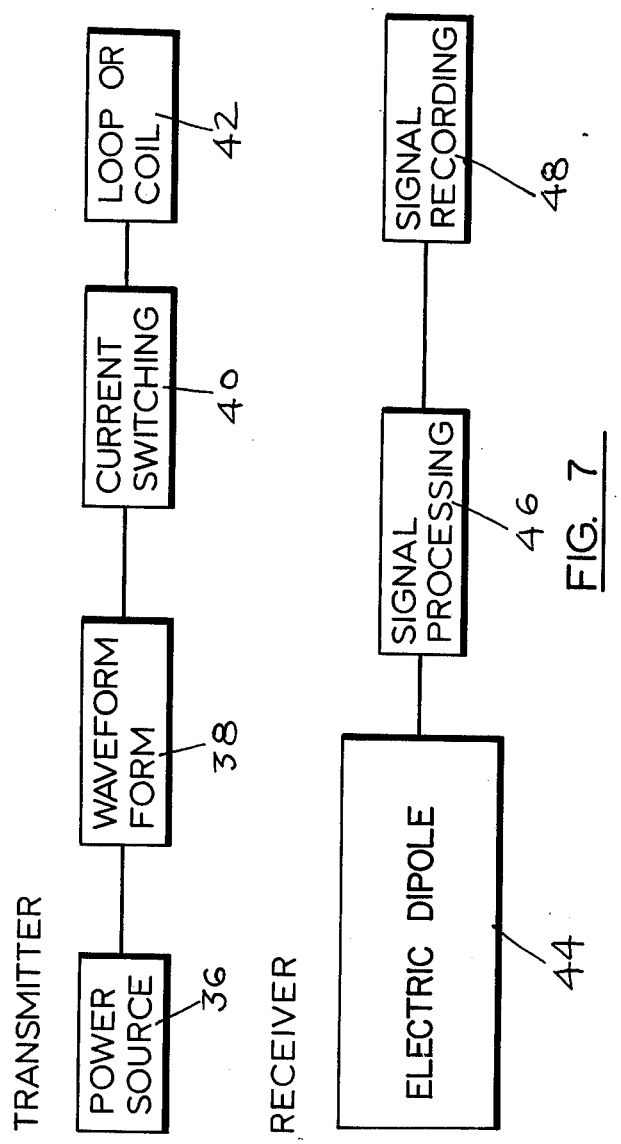
FIG. 7 is a schematic illustration of apparatus for practising the invention.

Techniques for inducing currents in the earth's crust are well known and it is not intended, in this specification, to describe them in detail. Generally speaking, one passes an appropriate current through an induction coil that is located in inductive proximity to the earth and transmits a time varying current therethrough of a magnitude that is capable of inducing current flow through the medium sufficient to establish a measurable induced polarization effect. Of importance in the present invention is the form of the time varying current in the induction coil. The time varying current must have a period where it varies unidirectionally for the period to maintain currents induced by the induction coil in the medium. The period must be sufficiently long in duration for the satisfactory build up of induced polarization effects across any ionic-electronic interface in the medium that one desires to detect. There must, in addition, be a second period following the first period in the wave form of the time varying current wherein the current does not vary substantially with respect to time and wherein there are substantially no currents in the medium that are electro-magnetically induced by the induction coil. It is during this second period that one detects the decay of any polarization effects that might have built up across ionic-electronic interface in the medium.

As indicated, it has been found that certain wave forms in the induction coil will achieve these objectives. The wave form of FIG. 1 is a suitable wave form. In this Figure, the numeral 10 generally refers to the current wave form in the transmitting loop of an induction coil. It will be noted that it increases linearly for a first period of time 12, remains constant for a second period of time 14, quickly drops to zero and, then, repeats.

FIG. 2 shows the voltage (and current) wave form in the ground, produced by the inductive effect of the current 10 in the transmitting loop. It will be noted that the unidirectional linearly varying current in the transmitting loop during the period 12 results in a constant voltage and current at any given location in the ground and that the substantially constant current in the induction loop during the second period 14 results in no induced currents in the ground.

The period 12 is sufficiently long in duration for the induced polarization effects to build up and the period 14 is sufficiently long for the electro-magnetic induction effects to decay and for measurement of induced polarization effects illustrated in FIG. 3 at 15. In order, then, to prospect a medium, one builds up the induced polarization effect during the period 12 and measures the induced polarization effects during the period 14. Apparatus for measuring induced polarization effects both by contact with the ground and magnetically is well known and it is not intended, in this specification, to refer to it in detail.

For a maximum transmitter moment of $10^8$ ampere turns meters and a time period 12 of one second, the electrical field in a polarizable medium 100 meters from the coil is 1000 microvolts per meter and will result in a current flow that is sufficient to cause the build up of the induced polarization effects at an ionic-electronic interface if the current flows for a sufficient time.

It has been found experimentally that polarization effects in the earth can be built up by unidirectional current flows longer than about one millisecond in duration. Thus, theoretically, one could use time periods 12 as short as one millisecond. In fact, however, in order to allow electro-magnetic induction effects time to decay so that clean induced polarization effects may be measured, it is found preferable to use times 12 of 100 milliseconds or more. In practise, the deeper the desired depth of penetration of the survey, the larger will be the charging time 12.

FIGS. 4, 5 and 6 are similar to FIGS. 1, 2 and 3 respectively with the exception that the wave form changes polarity. With this particular wave form, the signal to noise ratio is enhanced because the signal zero level may be more readily determined than in the case of using a unidirectional signal. In the case of this wave form, the polarization effects would be built up during the periods 16 and 18 of the transmitter loop current wave form and measurement of the polarization effects would be made during the periods 20 and 22. The induced voltage is indicated by numeral 17 and the polarization effects by the numeral 19.

A schematic representation of the apparatus required for making inductively energized induced polarization measurements is shown in FIG. 7. The transmitter is composed of a power source 36, wave form control current switching consoles 38 and 40, respectively, as well as a transmitting loop or coil. For portable use, the power source could be batteries or a motor-generator. The wave form control is programmed to control the current amplitude and polarity. The current switching console carries the current which is fed to the transmitting loop or coil having a moment sufficient for the wave form chosen, the resistivity of the medium and the distance from the transmitter to the medium.

The receiver sensor 44 is an electric dipole. The voltages from the sensor are processed in the signal processing console 46 according to the wave form used and are then recorded in the signal recorder 48.

The technique of the present invention could be useful in geological mapping, mineral, groundwater and petroleum exploration, as well as the search for conductive objects hidden below the ground or water surface.

What is claimed as my invention is:

1. In a method of geophysically prospecting a polarizable medium the steps of locating an induction coil in inductive proximity to the medium and transmitting a time varying current therethrough of a magnitude capable of inducing current flow through the polarizable medium sufficient to establish a measureable induced polarization effect;

said time varying current in said induction coil having a first period where it varies unidirectionally for the first period to maintain current flow induced by the induction coil in the medium;

said time varying current in said induction coil having a second period following said first period wherein said time varying current does not vary substantially with respect to time and wherein there are substantially no currents in said medium induced to said induction coil;

said first period of time being sufficiently long in duration for induced polarization effects to build up in the medium;

said second period of time being sufficiently long in duration for the electro-magnetic effects to decay and for measurement of the induced polarization effects in the medium; and detecting any induced polarization effects that may be present in said second period by measurement of transient electric field components.

2. In a method of geophysically prospecting a polarizable medium the steps claimed in claim 1 wherein said time varying current in said induction coil varies substantially linearly with respect to time.

* * * * *